Patented Feb. 11, 1941

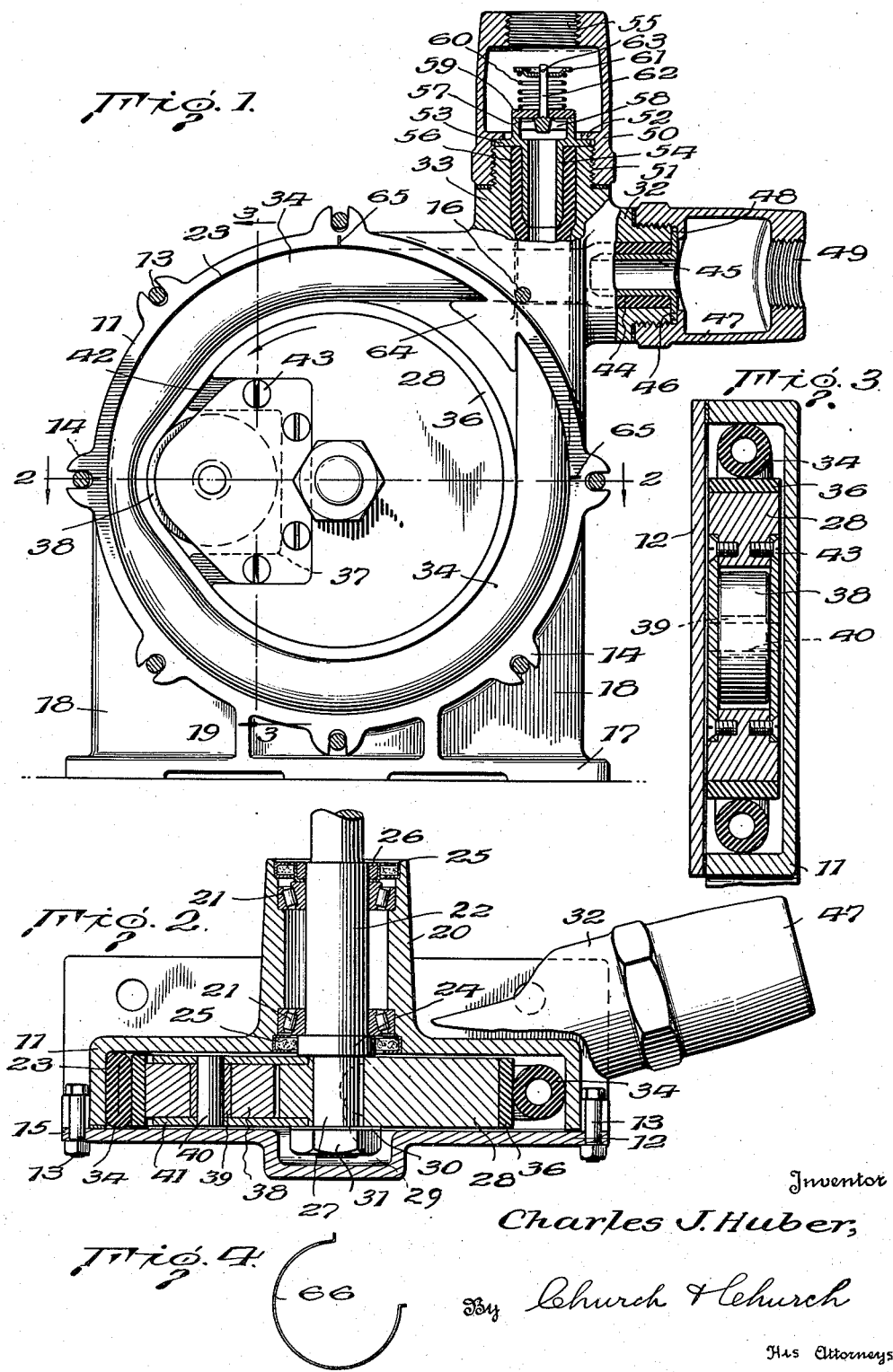

2,231,579

UNITED STATES PATENT OFFICE 2,231,579

PUMP

Charles J. Huber, Baltimore, Md., assignor to Downingtown Manufacturing Company, Downingtown, Pa.

Application January 31, 1938, Serial No. 188,003

8 Claims. (Cl. 103—149)

This invention relates to pumps, and more particularly to pumps of simple construction in which the fluid is confined within an elastic tube which is progressively compressed to force the liquid lengthwise thereof.

One of the objects of the invention is to provide such a pump which is of exceedingly simple construction and comprises a minimum number of parts, so that it may be economically manufactured and may be readily assembled or disassembled to facilitate cleaning and repair. Further objects are to provide such a pump which will be durable in use, which will be highly efficient, which will operate against high back pressure, and in which the tube is reinforced against over-enlargement by the back-pressure. Still further objects of the invention, and the details of construction and operation of one embodiment of the invention, will be apparent from the following specification when read in conjunction with the accompanying drawing, in which:

Figure 1 is a view in front elevation, partly broken away, of a pump embodying the invention;

Fig. 2 is a view in horizontal section, taken on line 2—2 of Fig. 1, but with the inlet port shown in plan view;

Fig. 3 is a view in vertical section, taken in the direction of the arrows on line 3—3 of Fig. 1, and Fig. 4 is a view of a detail which may be used.

As shown in the drawing, the structure comprises a casing formed of a body member 11 open on its front side, such opening being closed by a substantially flat cover plate 12 detachably secured to the body member of the casing by bolts 13, or similar means, such bolts being shown as engaged in slotted lugs 14 on the body member and passing through openings in lugs 15 in the cover plate 12, a threaded stud 16 being used at one point at which it is not desirable to use a bolt.

The casing body 11 is provided with a base 17, preferably formed integrally therewith and connected thereto by a vertical web 18 in the central plane of the casing and, if desired, by reinforcing webs 19, as shown in Fig. 1. On its rear face, the casing body 11 is formed with an extension 20, preferably integral with the casing body, to receive, and support in bearings 21 therein, a shaft 22 which is in line with the center of the circular opening 23 in the casing. The shaft 22 is preferably formed with an integral, enlarged thrust collar 24, suitable packing rings 25 and a bearing-retaining nut 26 being provided to protect the bearings and hold them in assembled relation. It will be understood that the shaft 22 is connected in any suitable manner to a driving means, preferably an electric motor, not shown.

The front end of the shaft 22 is preferably formed with a reduced extension 27, to which a rotor 28 is secured by a key 29, washer 30, and a nut 31 which is threaded upon the extension 27 and clamps the rotor 28 against the collar 24. As shown in Fig. 2, the cover plate 12 is cupped to receive the end of the shaft extension 27 and the nut 31.

The opening 23 in the casing body 11 is circular, about the axis of the shaft 22, and generally of uniform depth in the direction of the axis. The casing body 11 is extended, in the upper right-hand corner, as shown, to form an inlet-connection boss 32 inclined backwardly from, and at a slight angle relative to, the rear wall of the casing body 11, as shown best in Fig. 2, and to form an upwardly-directed outlet-connection boss 33 in the plane of the casing body 11.

A resilient tube 34, preferably substantially circular in cross section and formed of rubber or similar material, is anchored at its ends in the bosses 32 and 33 and extends from the boss 32 forwardly at a slight angle and through an opening into the casing body, about the opening in such casing body in contact with the inner surface of the peripheral wall thereof for a circumferential extent of 270°, and then upwardly, without bending, into the outlet-connection boss 33.

The rotor 28 is generally circular in shape, of a thickness slightly less than the axial extent of the opening in the casing body, and of a radius sufficiently less than that of such opening to accommodate the tube 34 and a continuous band 36 of suitable material between such rotor and the peripheral wall of the casing body. The width of the continuous band 36 corresponds to the thickness of the rotor. Such band 36 is preferably readily flexible in the direction of its radius, and it is preferably formed of rubber or similar suitable material. At one point in its circumference, the rotor 28 is provided with a radial recess 37 to receive a roller 38 mounted on a bushing 39 and pintle 40, the ends of the pintle 40 being supported in side plates 41 which are sunk in rabbets 42 about the margins of the recess 37 and secured, as by screws 43, to the rotor 28 so as to be flush with the front and rear faces thereof. The diameter of the roller 38 is preferably comparatively large, in order to avoid unduly sharp bending of the band 36 and the tube 34, its diameter in the structure shown being approximately two-fifths that of the rotor 28. The axis of rotation of the roller 38 is so located that its periphery will be spaced from the inner wall of the casing, as shown at the left end of Fig. 2, a distance substantially equal to, or slightly less than, the combined thickness of the band 36 and the double wall of the tube 34, so that the tube will be compressed by the roller until it is closed, or substantially closed, at the point engaged by the roller. It will be apparent that, if this distance is slightly less than the thickness of the band and the walls of the tube, the walls of the tube will be slightly compressed and thereby reduced in thickness, thus effecting a more nearly complete closure of the tube.

The inlet end of the tube 34 is anchored in the inlet-connection boss 32, as stated heretofore, the boss being formed with a counterbore 44 into which the end of the tube 34 is distended, and the wall of the tube compressed, by a ferrule 45 which is forced into the end of the tube and which is preferably tapered at its inner end to facilitate assembly and provided with a flat annular flange 46 at its outer end. A pipe fitting 47, threaded upon the outer end of the boss 32 is formed with an inner flange or shoulder 48 which engages the flange 46 of the ferrule and clamps it against the end of the boss, such fitting being also threaded at 49, or otherwise suitably formed, to facilitate connection to the point of supply. The outlet end of the tube 34 is similarly anchored in the outlet-connection boss 33, except for the provision of a valve permitting discharge but preventing reverse flow into such end of the tube. The outlet-pipe fitting 50 is preferably identical with the inlet fitting 47, threaded at 51 upon the outer end of the boss 33, formed with an inner flange 52 to clamp the flange 53 of the ferrule 54 against the end of the boss, and threaded at 55, or otherwise suitably formed, if desired, for connection to a discharge pipe. The boss 33 is formed with a counterbore 56 within which the end of the tube 34 is distended by the ferrule 54, such ferrule being identical with the ferrule 45 except that it is formed, as shown, with an annular flange 57 having therein a spider 58, a valve disc 59 being resiliently held against the end of the flange 57 by a compression spring 60 which is engaged by the disc and a cap 61 which is secured to the spider 58 by a stem 62 which extends through the cap and a cotter pin 63 passing through the stem above such cap. It will be apparent that, while the outlet valve is shown as detachably secured to the outlet ferrule, any suitable valve structure and mounting could be used.

In operation, as the roller 38 moves in the direction of the arrow, in Fig. 1, it engages the tube 34 approximately 40° before it reaches vertical position and gradually compresses the tube, the tube being closed when the roller reaches vertical position. Throughout the succeeding 270° of movement the roller progressively compresses the tube, forcing the fluid before it, the tube gradually closing in front of the roller, and gradually opening behind the roller due to its inherent tendency to resume its normal cross-section shape. After the roller 28 has reached its extreme right-hand position, diametrically opposite to that shown in Fig. 1, it permits the tube 34 to open gradually and the valve 59 closes to prevent reflux.

A fillet 64, preferably formed integrally with the casing body 11, and of a thickness approximately equal to that of the tube 34 when it is in compressed condition, as shown in Fig. 1, is provided where the straight inlet and outlet portions of the tube 34 diverge, in order to reinforce the tube 34 from bulging or undue distension. As shown in Fig. 1, the short radial slots 65 are preferably provided in the casing wall adjacent the points of tangency of the straight inlet and outlet portions of the tube 34, in order that when it is desirable, because of wear or to compensate for variation in the thickness of the tube 34, a shim 66, as shown in detail in Fig. 4, may be inserted against the inner periphery of the casing wall and anchored in place by inserting its outwardly-bent ends in the slots 65.

It will be apparent that the pump as a whole is of simple construction and may be economically formed and readily repaired, while at the same time any possibility of leakage is avoided and inlet and outlet attachments may be readily made. By the use of the continuous band 36 wear of the tube 34 is minimized, since there is a minimum of movement between such band and the tube. Likewise, the use of a rotor which, with the continuous band 36, practically fills the tube coil, protects the tube 34 from being unduly distended by the pressure therein.

What is claimed is:

1. A pump comprising a casing having a recess therein formed with a cylindrical peripheral wall, an impeller tube within said casing adjacent said wall, a rotor member in said casing and mounted for rotation about the axis of the cylinder defined by said wall, a roller carried by said rotor member and projecting outwardly from the periphery thereof, a continuous flexible band engaged about said rotor and engaging said roller, said band being free to creep circumferentially of the casing relative to the tube.

2. A pump comprising a casing having a recess therein formed with a cylindrical peripheral wall, a collapsible impeller tube within said casing adjacent said wall, a rotor member within said casing and mounted for rotation about the axis of the cylinder defined by said wall, the periphery of said rotor member being generally circular and uniformly spaced from said cylindrical wall of said recess, a roller carried by said rotor member and projecting outwardly from the periphery thereof to an extent substantially equal to the diameter of the opening in said tube, and a continuous annular band interposed between said rotor and said tube and free to creep circumferentially of said casing relative to said tube.

3. A pump comprising a casing having a recess therein formed with a cylindrical peripheral wall, said casing being provided with an inlet opening and an outlet opening, an impeller tube extending about the interior of said casing adjacent said wall and having its ends anchored in said openings, a rotor member mounted centrally of said cylindrical wall, a roller carried by said rotor member for progressively compressing said impeller tube, one of said openings being inclined out of the plane of said cylindrical wall, whereby one end of said tube overlaps the other end thereof and is spaced axially therefrom, and a continuous annular member interposed between said rotor and roller and said tube and free to creep circumferentially of said casing relative to said tube.

4. A pump comprising a casing having a recess therein the peripheral wall of which is generally circular, said casing being formed with an inlet opening and an outlet opening, an impeller tube within said casing adjacent said wall with its ends extending through said openings, a rotor member within said casing and mounted for rotation about the axis of the cylinder defined by said wall, the periphery of said rotor member being generally circular and uniformly spaced from said cylindrical wall of said recess, a roller carried by said rotary member for progressively compressing said impeller tube, and a continuous flexible band engaged about said rotor member and roller as a whole and free to creep relatively to said tube.

5. A pump comprising a casing having a recess therein the peripheral wall of which is generally cylindrical, said casing having an inlet opening and an outlet opening extending from said recess to the outside of said casing, at least one of said openings being inclined axially of the cylinder defined by said wall, whereby said openings overlap and intersect the outer surface of said casing in different planes along the axis of the cylinder defined by said wall, a collapsible impeller tube extending about said recess adjacent said wall and having its ends anchored in said openings, means rotatable about the axis defined by said cylindrical wall for progressively compressing said impeller tube and a continuous annular member of uniform thickness interposed between said means and said tube and free to creep circumferentially of said casing relative to said tube.

6. A pump comprising a casing having a recess therein with a generally cylindrical peripheral wall, a collapsible impeller tube within said casing adjacent said wall, means rotatable about the axis defined by said cylindrical wall for progressively compressing said impeller tube, and a continuous annular member of uniform thickness interposed between said means and said tube and free to creep circumferentially relative to said tube.

7. A pump comprising a casing having a recess therein the peripheral wall of which is generally cylindrical, said casing having an inlet opening and an outlet opening extending from said recess to the outside of said casing, a collapsible impeller tube extending about within said recess adjacent said wall and having end portions bent outwardly from the circular portion thereof so as to be angularly disposed relative to each other and anchored in said openings, means rotatable about the axis defined by said cylindrical wall for progressively compressing said impeller tube, and means located in the angle defined by said outwardly bent portions of said impeller tube for reinforcing said impeller tube against dilation inwardly of said recess.

8. A pump comprising a casing having a recess therein the peripheral wall of which is generally cylindrical, said casing having an inlet opening and an outlet opening extending from said recess to the outside of said casing, a collapsible impeller tube within said casing comprising a curved portion extending about said recess adjacent said wall and integral inlet and outlet tangential portions extending from said curved portion into said inlet and outlet openings, respectively, means rotatable about the axis defined by said cylindrical wall for progressively compressing said impeller tube, and means located in the angle between the outlet tangential portion of said tube and the circumference of a circle of the same radius as that defined by the inner edge of the curved portion of said tube for reinforcing said impeller tube against dilation inwardly of said recess.

CHARLES J. HUBER.